Nov. 8, 1938.   J. K. BYROM   2,135,634

SHAFT COUPLING

Filed Jan. 19, 1938

INVENTOR,
John Knights Byrom,
BY
Frank S. Appleman,
ATTORNEY.

Patented Nov. 8, 1938

2,135,634

UNITED STATES PATENT OFFICE 2,135,634

SHAFT COUPLING

John Knights Byrom, Didsbury, Manchester, England, assignor to The Renold and Coventry Chain Company Limited, Didsbury, Manchester, England, a British company Application January 19, 1938, Serial No. 185,777
In Great Britain February 12, 1937

4 Claims. (Cl. 64—14)

This invention relates to couplings for connecting together two shafts which are end-to-end but between which there may be slight lack of alignment. The object of the invention is to provide a coupling for this purpose which will be simple and inexpensive and will not be subject to undue wear when used with shafts which are out of alignment.

According to this invention the coupling consists of two metal flanges formed with complementary projections on their opposed faces which are similar to the teeth of a dog clutch and a rubber buffer is interposed between the two flanges, which buffer comprises a hub portion and a number of radial arms integral with the hub portion which are interposed between the edges of the projections on the two flanges.

Preferably the edges of the projections are straight as seen in a direction parallel to the axis of rotation but are concave as viewed in the radial direction, and the arms of the rubber buffer are made barrel shaped in cross-section to fit the concave edges of the projections. This curvature enables the two shafts to which the flanges are attached to be slightly out of alignment without causing undue wear of the rubber buffer.

Referring to the accompanying drawing—

Figure 1:
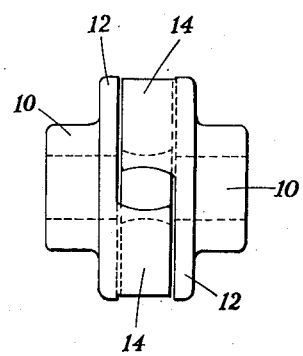
Figure 1 is a side elevation of a coupling according to this invention.
Figure 2:
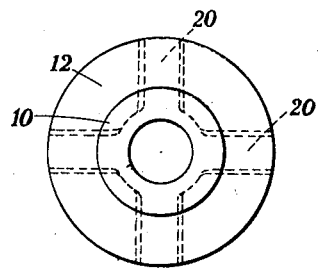
Figure 2 is an end elevation.
Figure 3:
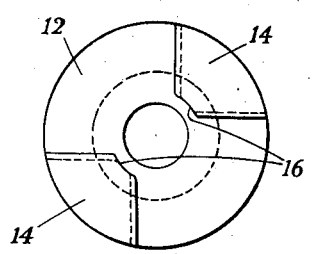
Figure 3 is an end view of one of the two coupling members.

Each of the coupling members consists of a sleeve or hub portion 10 formed with a flange 12 and the face of this flange remote from the hub portion as shown clearly in Figure 3 is provided with two diametrically opposed projections 14. Each of these projections is quadrantal in shape but they do not occupy the whole of the two opposite quadrants, their edges being set back from the radial margins of the quadrants. The inner corner of each projection is also cut off to an arcuate curve 16, concentric with the flange. The straight edges of the projections are concave along their length as shown in Figure 1, as they would be if pared with a gouge.

Figure 4:
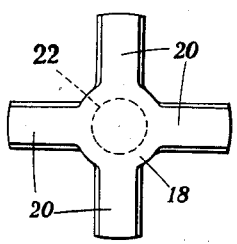
Figure 4 is an end elevation of the rubber spider.
Figure 5:
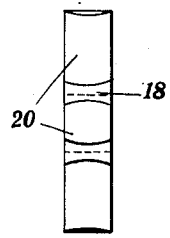
Figure 5 is a side elevation thereof.

When the two coupling members are placed together face to face with the projections 14 symmetrically disposed in relation to one another there is a space between them consisting of a central cylindrical hollow defined by the edges 16 and four radial spaces or arms each of which is barrel-shaped in cross-section. The coupling is completed by a rubber spider shown in Figures 4 and 5 constituting a buffer, which is moulded to such a shape as to fit within the space just referred to, this spider comprising a central cylindrical portion 18 and four radial arms 20 integral therewith the edges of which are convex to fit the concave edges of the projections. The parts are so arranged that when they are assembled together the flat faces of the projections 14 are spaced slightly away from the faces of the opposite flange, the faces of the buffer being also spaced away from the faces of the flanges, as clearly shown in Figure 1. This clearance between the parts enables the shafts to which the coupling members are fixed to run slightly out of alignment relative to one another and the curvature of the edges of the projections 14 and of the arms 20 of the buffer minimize friction and wear of the buffer when running out of alignment, as well as the loss of power occasioned by such friction. The parts can also adjust themselves slightly in the axial or endwise direction without causing undue wear.

Although a construction has been described in which each coupling member has two projections and the buffer has four arms, it would be within the invention to provide three or more projections on each member, the buffer being formed with twice that number of arms. The hub of the buffer may be formed with a central hole as indicated in dotted lines at 22 in Figure 4.

I claim:

1. A shaft coupling comprising in combination two flanges each formed with a plurality of projections on its face circumferentially spaced and adapted to receive in the spaces between them the projections on the other flange when the two flanges are juxtaposed, said spaces being circumferentially wider than said projections and the edges of said projections being straight in the direction across the face of the flange and concave in the direction parallel to the axis of the coupling, and a rubber buffer interposed between said two flanges, said buffer comprising a hub portion and a plurality of radial arms integral therewith which are interposed between the edges of the projections on the two flanges.

2. A shaft coupling comprising in combination two flanges each formed with a plurality of projections on its face circumferentially spaced and adapted to receive in the spaces between them the projections on the other flange when the two flanges are juxtaposed, said spaces being circumferentially wider than said projections and the edges of said projections being straight in the direction across the face of the flange and concave in the direction parallel to the axis of the coupling, and a rubber buffer interposed between said two flanges, said buffer comprising a hub portion and a plurality of radial arms integral therewith which are interposed between the edges of the projections on the two flanges, and are barrel-shaped in cross-section to fit the concave edges of the projections.

3. A shaft coupling comprising in combination two flanges each formed with a plurality of projections on its face circumferentially spaced and adapted to receive in the spaces between them the projections on the other flange when the two flanges are juxtaposed, said spaces being circumferentially wider than said projections and the edges of said projections being straight in the direction across the face of the flange and concave in the direction parallel to the axis of the coupling, and a rubber buffer interposed between said two flanges, said buffer comprising a hub portion and a plurality of radial arms integral therewith which are interposed between the edges of the projections on the two flanges and are barrel-shaped in cross-section to fit the concave edges of the projections, the thickness of the arms across the flat sides thereof being less than the height of the projections.

4. The invention of claim 1 wherein those edges of each arm of the buffer which abut against the edges of the projections are parallel to one another.

JOHN KNIGHTS BYROM.